(12) United States Patent
Zhang et al.

(10) Patent No.: US 7,667,157 B2
(45) Date of Patent: Feb. 23, 2010

(54) PORTABLE PLENUM LASER FORMING

(75) Inventors: Wenwu Zhang, Schenectady, NY (US); Marshall Gordon Jones, Scotia, NY (US); Brian Harlow Farrell, Amsterdam, NY (US)

(73) Assignee: General Electric Company, Niskayuna, NY (US)

( * ) Notice: Subject to any disclaimer, the term of this patent is extended or adjusted under 35 U.S.C. 154(b) by 461 days.

(21) Appl. No.: 11/089,750

(22) Filed: Mar. 24, 2005

(65) Prior Publication Data

US 2006/0065651 A1 Mar. 30, 2006

Related U.S. Application Data

(60) Provisional application No. 60/614,334, filed on Sep. 29, 2004.

(51) Int. Cl.
*B23K 26/12* (2006.01)
*B23K 26/16* (2006.01)

(52) U.S. Cl. .............. 219/121.63; 219/121.68; 219/121.7; 219/121.86; 266/165; 266/274; 266/276; 269/46

(58) Field of Classification Search ............ 219/121.63, 219/121.64, 121.86, 121.68, 121.7; 266/274, 266/165, 276; 269/46
See application file for complete search history.

(56) References Cited

U.S. PATENT DOCUMENTS

| 1,888,891 | A | | 11/1932 | Schmidt |
| 2,428,825 | A | | 10/1947 | Arnoldy |
| 3,368,377 | A | | 2/1968 | Hirayama et al. |
| 3,591,154 | A | * | 7/1971 | Ramberg et al. ............ 266/127 |
| 3,676,673 | A | * | 7/1972 | Coleman ............... 250/453.11 |
| 3,790,801 | A | * | 2/1974 | Coleman ............... 250/453.11 |
| 4,007,616 | A | | 2/1977 | Aleck |
| 4,411,733 | A | * | 10/1983 | Macklin et al. ............. 216/71 |
| 4,528,436 | A | * | 7/1985 | Stol ........................ 219/74 |
| 4,727,641 | A | | 3/1988 | Kanatani et al. |
| 4,746,373 | A | * | 5/1988 | Yamada et al. ............. 419/8 |
| 5,135,695 | A | | 8/1992 | Marcus |
| 5,153,409 | A | * | 10/1992 | Rudaitis et al. ......... 219/121.83 |
| 5,233,150 | A | | 8/1993 | Schneebeli et al. |

(Continued)

FOREIGN PATENT DOCUMENTS

DE 10007831 C1 * 8/2001

(Continued)

OTHER PUBLICATIONS

W. Zhang et al., "Laser Forming: Industrial Application," Proceedings of the 23rd Int'l Congress on Applns of Laser and Electro-Optics 2004, Oct. 2004.

(Continued)

*Primary Examiner*—Samuel M Heinrich
(74) *Attorney, Agent, or Firm*—Penny A. Clarke

(57) ABSTRACT

A laser forming system includes a motion system. A mounting fixture is affixed to the motion system for supporting a workpiece. A plenum is affixed to the fixture for surrounding the workpiece. A gas supply is joined in flow communication with the plenum for channeling thereto an inert gas under pressure to fill the plenum. A laser is aligned with the plenum for projecting a laser beam at the workpiece for laser forming thereof inside the plenum.

10 Claims, 3 Drawing Sheets

U.S. PATENT DOCUMENTS

| | | | |
|---|---|---|---|
| 5,359,872 A | | 11/1994 | Nashiki |
| 5,407,119 A | * | 4/1995 | Churchill et al. .......... 228/124.5 |
| 5,607,605 A | * | 3/1997 | Musasa et al. ......... 219/121.64 |
| 5,713,130 A | | 2/1998 | Fukuda et al. |
| 5,735,962 A | * | 4/1998 | Hillman .......................... 134/3 |
| 5,741,577 A | * | 4/1998 | Yamamoto et al. .......... 428/212 |
| 5,760,366 A | * | 6/1998 | Haruta et al. .......... 219/121.68 |
| 5,837,960 A | * | 11/1998 | Lewis et al. ............. 219/121.63 |
| 5,846,370 A | * | 12/1998 | O'Connor ................ 156/272.8 |
| 5,981,901 A | * | 11/1999 | La Rocca ............... 219/121.63 |
| 6,127,649 A | * | 10/2000 | Toller et al. ............ 219/121.86 |
| 6,178,798 B1 | | 1/2001 | Kowalski et al. |
| 6,200,405 B1 | * | 3/2001 | Nakazawa et al. .......... 156/248 |
| 6,339,205 B1 | * | 1/2002 | Nakayama ............. 219/121.36 |
| 6,403,916 B1 | * | 6/2002 | Spooner et al. ........ 219/121.63 |
| 6,554,600 B1 | * | 4/2003 | Hofmann et al. ......... 425/174.4 |
| 6,621,091 B2 | * | 9/2003 | Pratt et al. ............. 250/559.33 |
| 6,622,540 B2 | | 9/2003 | Jones et al. |
| 6,712,579 B2 | * | 3/2004 | Fujii et al. ............... 414/744.5 |
| 6,764,385 B2 | * | 7/2004 | Boumerzoug et al. ......... 451/39 |
| 6,846,179 B2 | * | 1/2005 | Chapouland et al. .......... 433/24 |
| 6,984,404 B1 | * | 1/2006 | Talton et al. ................ 424/490 |
| 2003/0104920 A1 | * | 6/2003 | Schwertfeger et al. ........ 501/54 |
| 2004/0118158 A1 | | 6/2004 | Schwertfeger et al. |

FOREIGN PATENT DOCUMENTS

| | | | |
|---|---|---|---|
| GB | | 1292174 | 7/1970 |
| GB | | 1292174 | 12/1989 |
| JP | | 357022893 A | * 2/1982 |
| JP | | 1313113 | 12/1989 |
| JP | | 5177366 | 7/1993 |
| JP | | 407061538 A | * 3/1995 |
| JP | | 410315167 A | * 12/1998 |
| JP | | 2002/219587 | 8/2002 |
| JP | | 2004162095 A | * 6/2004 |

OTHER PUBLICATIONS

J. Zhang et al. "Effects of Scanning Schemes on Laser Tube Bending," Proceedings of the 23rd Int'l Congress on Applns. of Laser and Electro-Optics 2004, Oct. 2004 pp. 1-10.

R. Kuckuck, "ES and H. Manual," vol. II, Part 20, Document 20.8, May 2000, pp. cover and 14-16.

Glove Box Technology, "welcome to Gove Box Technology, LTD." www.glovebox.co.uk, copyright 2004, 4 pages.

EP 052504271 Search Report, Dec. 19, 2005.

JP5177366, Japanese Abstract, Jul. 20,1993.

JP1313113, Japanese Abstract, Dec. 18, 1989.

* cited by examiner

PORTABLE PLENUM LASER FORMING

This application claims the benefit of U.S. Provisional Application No. 60/614,334 filed Sep. 29, 2004.

The U.S. Government may have certain rights in this invention under Contract Number 70NANB2H3031 awarded by the government agency NIST ATP.

BACKGROUND OF THE INVENTION

The present invention relates generally to manufacturing processes, and, more specifically, to laser forming.

Industrial lasers are continually being developed for various manufacturing processes. Lasers are currently being utilized for welding, cutting, and drilling operations in various materials, including metal and high strength superalloys which have enhanced strength at high temperature as typically found in modern gas turbine engines.

Laser forming is yet another process being developed for industrial applications in which the laser beam is used to precisely heat and deform a metal substrate for changing its shape. The localized heating by laser will typically not exceed the melting temperature of the parent material but must be sufficiently hot to effect local thermal deformation. At such elevated temperatures, the parent material may be subject to changes in the microstructure thereof, as well as surface oxidation and surface discoloration or associated marks.

However, these adverse affects may be reduced or eliminated by precisely controlling heating of the material during laser scanning thereof, and conducting such laser processing in a vacuum. Vacuum processing correspondingly requires a suitably large chamber for containing the workpiece and laser equipment which have associated complexity, cost, and increased process time required for evacuation of the ambient air.

Instead of evacuating the vacuum chamber, an inert gas may be provided therein for protecting the workpiece material during heat generating processes such as welding or laser forming for example. However, the chamber must be sized to contain not only the workpiece but the associated welding or laser processing equipment.

Alternatively, the inert gas may be provided through gas nozzles to locally bathe the work site with the inert gas, and is therefore subject to the ability to suitably supply and maintain the inert gas over the workpiece while it remains at elevated temperature.

Accordingly, it is desired to provide an improved laser forming apparatus in which the workpiece is locally protected by an inert gas throughout the laser scanning process.

BRIEF DESCRIPTION OF THE INVENTION

In accordance with one aspect of the present technique, a laser forming system includes a motion system. A mounting fixture is affixed to the motion system for supporting a workpiece. A plenum is affixed to the fixture for surrounding the workpiece. A gas supply is joined in flow communication with the plenum for channeling thereto an inert gas under pressure to fill the plenum. A laser is aligned with the plenum for projecting a laser beam at the workpiece for laser forming thereof inside the plenum.

In accordance with another aspect of the present technique, a chamber is configured for surrounding a workpiece. The chamber includes a window configured to seal the chamber, the window being transparent to a laser beam for projection therethrough. The chamber further includes an inlet configured for receiving an inert gas and an outlet configured for discharging the inert gas.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
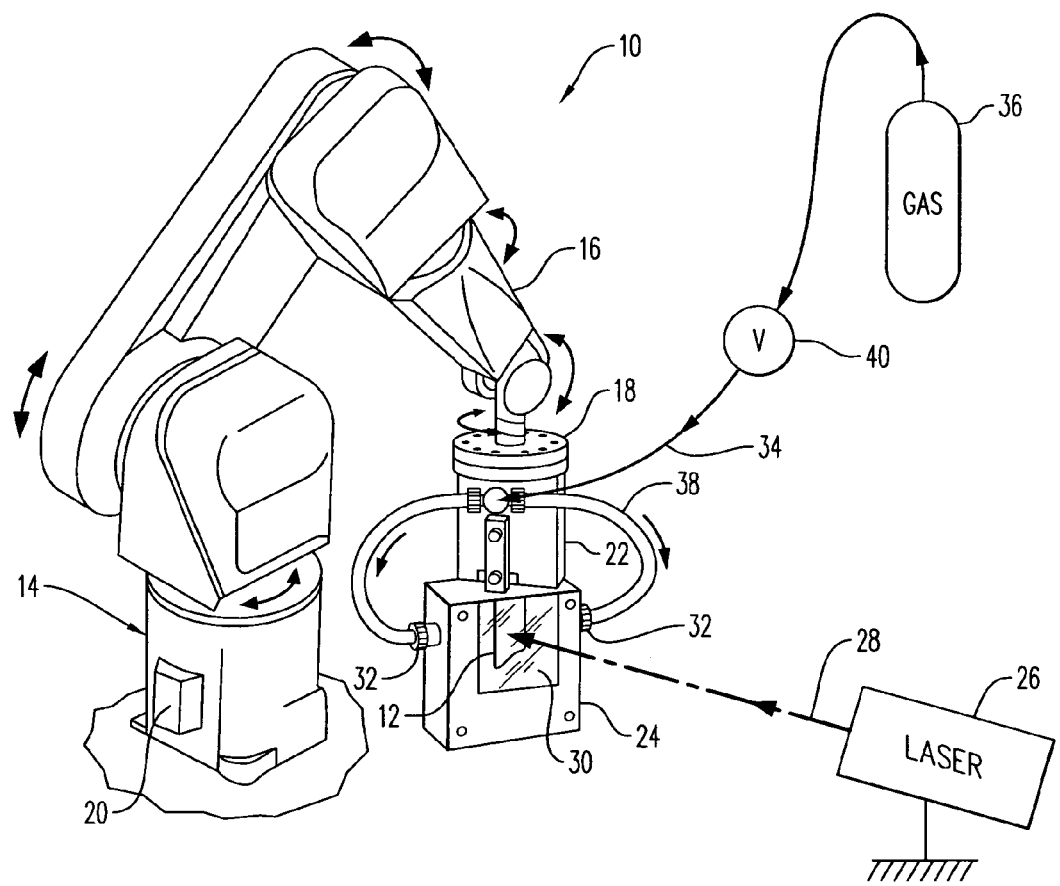
FIG. 1 is a schematic representation of a laser forming apparatus in accordance with an exemplary embodiment.

Illustrated schematically in FIG. 1 is a laser forming apparatus or system 10 specifically configured for laser forming a workpiece or part 12. The workpiece may have any suitable configuration and material composition, such as the exemplary compressor airfoil for a modern gas turbine engine. The compressor airfoil is typically manufactured of a high strength superalloy metal, such as a nickel-based superalloy having enhanced strength at elevated temperature in the hot environment of the gas turbine engine.

The apparatus 10 includes a motion system, examples of which include a numerically controlled (NC) system, a motorized stage and a robot system. In the exemplary embodiment depicted in FIG. 1, the motion system is a multiaxis robot 14 which includes an articulated or movable arm 16 extending from a proximal or base end thereof, with an end effector 18 at the opposite distal end thereof. The base end of the robot may be suitably mounted to a foundation or floor, and the end effector 18 may be in the form of a rotary spindle or mounting plate.

The robot also includes means in the form of a controller 20 which is operatively joined to the robot and suitably configured for precisely moving the robot arm 16 in multiple degrees of freedom.

The robot 14, itself, may have any conventional configuration and operation such as that commercially available from the Staubli Corporation, of Duncan, S.C. under Model Number Staubli RX90. The robot arm 16 illustrated in FIG. 1 includes six rotary joints for permitting six independent rotations of the articulated segments of the arm in a multiple degree of freedom system.

The controller 20 is in the form of a typical digitally programmable computer which may be configured in suitable software for precisely controlling the three dimensional movement in space of the end effector 18. In this way, the robot as controlled by its computer has the common technical effect of precisely moving the end effector 18 for conducting various manufacturing processes which require precise movement of components attached thereto.

Figure 2:
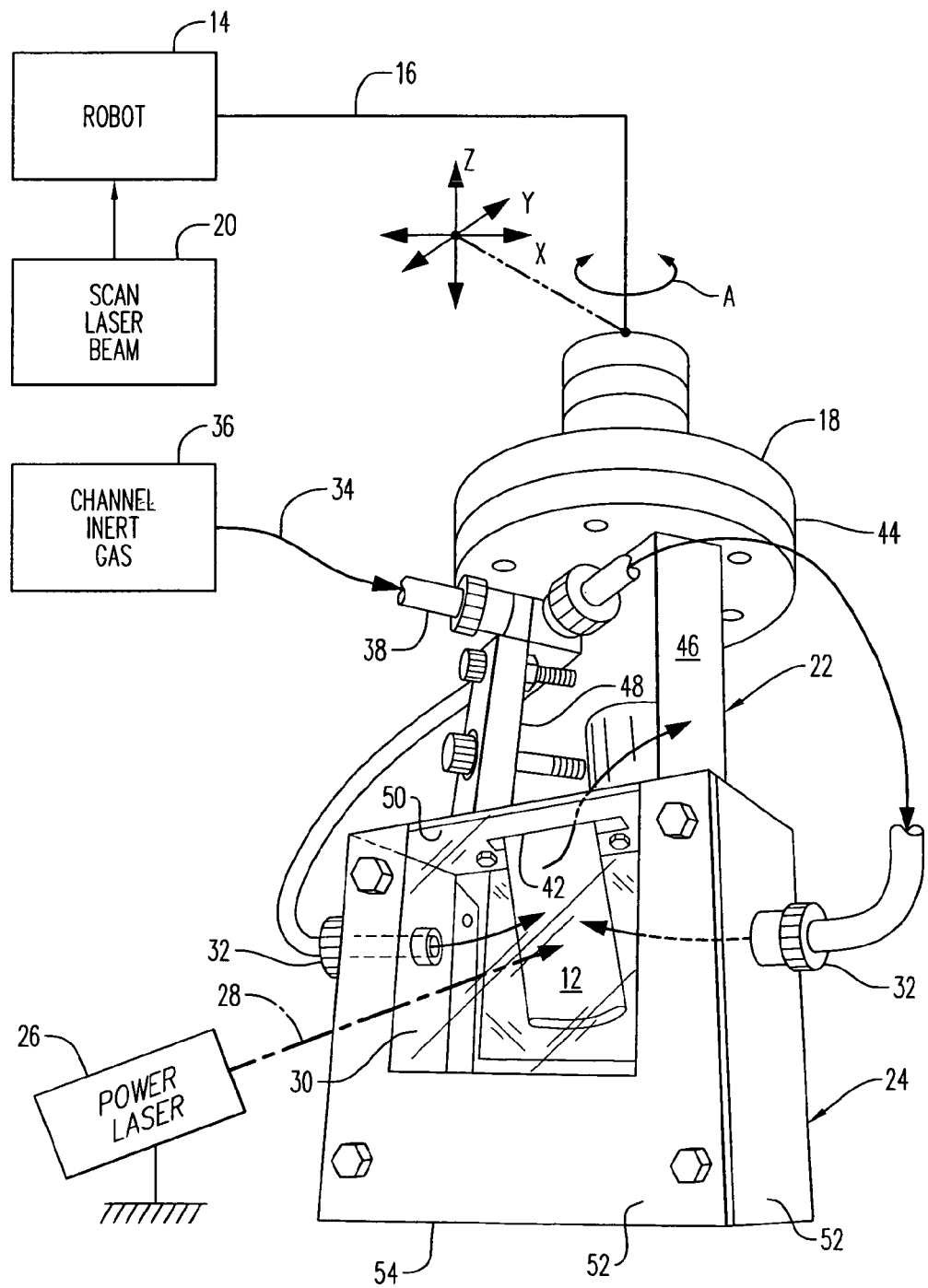
FIG. 2 is an enlarged elevational view of a mounting fixture supporting a workpiece inside a portable plenum attached to an end effector of the robot illustrated in FIG. 1.

For example, FIG. 2 illustrates schematically that the various rotary joints of the robot arm may be used to obtain translation of the end effector 18 in the three typical orthogonal axes X, Y, Z, as well as rotation A of the end effector 18 around the longitudinal axis thereof.

Referring to both FIGS. 1 and 2, the apparatus 10 further includes a mounting fixture 22 suitably affixed or attached to the effector 18 by screw or bolt fasteners for example. In this way, the robot may be used for precisely moving the mounting fixture 22 attached to its distal end, with the mounting fixture 22 in turn supporting the desired workpiece or part 12 therein.

Correspondingly, a portable chamber or plenum 24 is suitably affixed to the mounting fixture 22 for simultaneous movement therewith, with the plenum surrounding the workpiece 12 in relevant part on the mounting fixture. The plenum provides a local protective enclosure or box around the workpiece for protecting the workpiece during any desired laser forming process.

For example, an industrial laser 26 may itself be suitably fixedly mounted to a support or foundation independent from the robot 14 and optically aligned with the plenum 24 supported on the mounting fixture 22 for projecting a laser beam 28 at the workpiece for laser forming thereof in any suitable process protected inside the enclosing plenum 24.

The laser may have any conventional configuration with suitable power for emitting the laser beam 28 for locally heating the intended workpiece to a desired elevated temperature. In the case of the superalloy compressor airfoil workpiece 12, the laser beam is effective for locally heating the metal thereof below the melting temperature of the metal but sufficiently high for causing local thermal deformation thereof for the intended laser forming process.

The specific laser forming process is not the subject of the present disclosure, but is relevant in its ability to locally heat the workpiece to an elevated temperature at which undesirable oxidation or other adverse heating effects may occur on the workpiece, which undesirable effects may be eliminated or reduced by protecting the workpiece in a suitable inert gas.

More specifically, the exemplary plenum 24 illustrated in FIGS. 1 and 2 preferably includes a suitable window 30 which preferably seals closed the plenum at the window, with the window being transparent to the laser beam 28 so that it may be projected therethrough to reach the workpiece inside the plenum.

The plenum 24 also includes one or more inlets 32 in the exemplary form of the two hose fittings illustrated which receive inert gas 34 under pressure from a gas supply 36. The gas supply 36 is joined to the plenum inlet 32 by suitable tubes or hoses 38, and corresponding hose fittings, and one or more valves 40 for controlling the flowrate of the gas. In this way, a suitable inert gas may be channeled under pressure to fill the portable plenum 24 attached to the end effector for protecting the enclosed workpiece 12 during laser forming thereof.

The laser 26 in an exemplary embodiment may be a continuous wave (CW) neodymium (Nd):yttrium-aluminum-garnet (YAG) laser having a wavelength of 1060 nm with a power rating of about 2 kw. Correspondingly, the window 30 may be formed of a thin transparent quartz window pane of about 0.5 mm thickness, which has a low coefficient of thermal expansion and can tolerate high thermal stresses due to the heat energy in the laser beam being transmitted therethrough. If desired, the quartz window may be coated with a suitable antireflection coating to substantially decrease laser heating of the quartz window itself and further decrease the possibility of undesirable window cracking during use.

The plenum 24, including the window 30, provide a substantially closed chamber in which the inert gas may be channeled to protect the workpiece during the laser forming process. Any suitable inert gas may be used, with Argon being preferred for the high temperature laser forming process contemplated to effect local thermal deformation of the workpiece. Other inert gases may also be used, such as nitrogen, although nitrogen is subject to the formation of undesirable nitrides in a metal workpiece at elevated temperatures.

FIG. 2 illustrates in more detail the two fittings 32 on opposite sides of the plenum 24 which define corresponding inlets connected to the hoses 38 for channeling the inert gas 34 inside the plenum 24. The plenum also includes a suitable outlet 42 for discharging or venting the inert gas 34 from the plenum during operation, as well as venting the initial air contained in the plenum which is purged from the plenum prior to commencement of the laser forming process. The outlet 42 may have any suitable form for discharging the inert gas from the plenum at a controlled flowrate to ensure sufficient coverage of the workpiece with the inert gas 34 for protection thereof.

Figure 3:
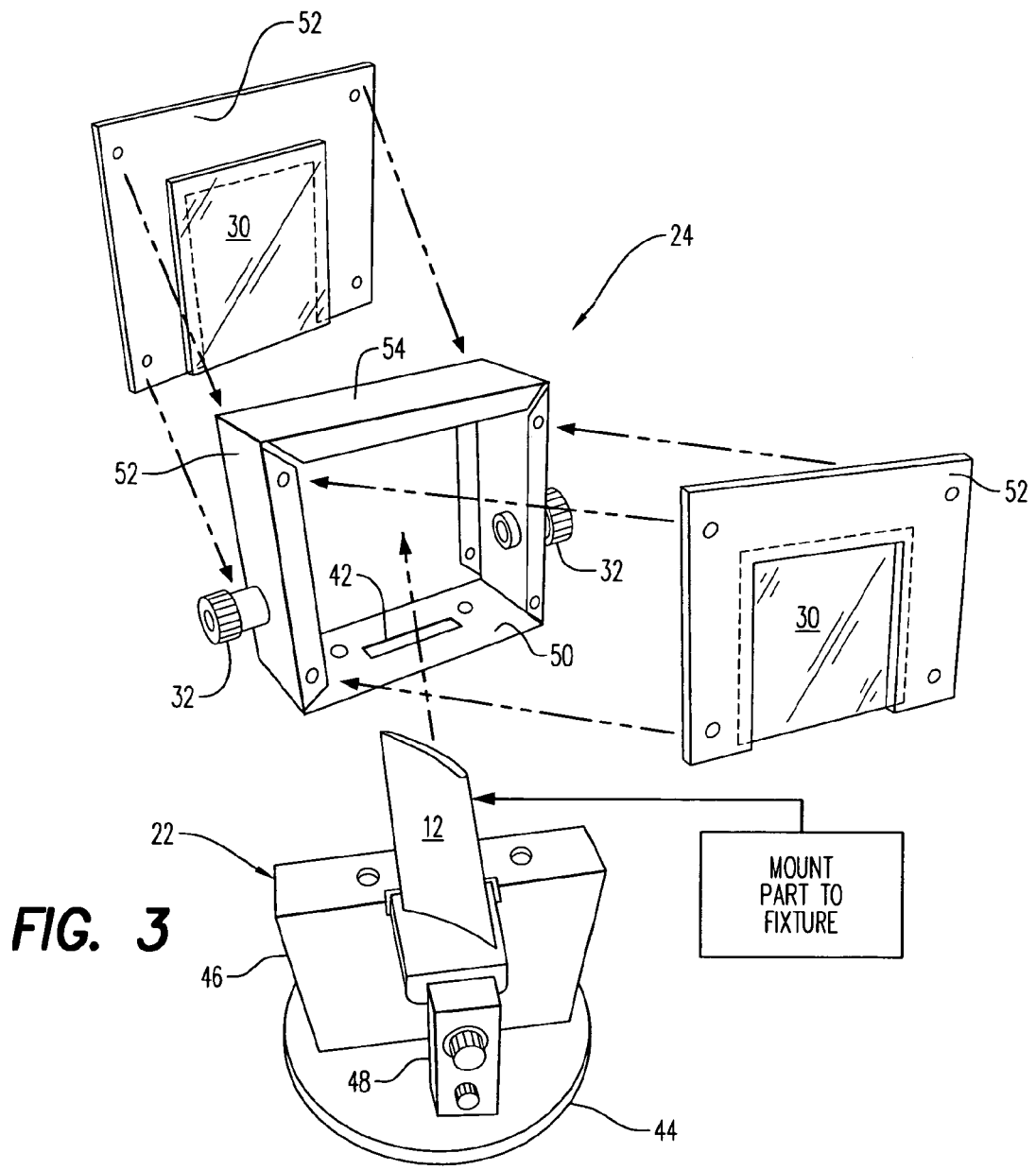
FIG. 3 is an exploded view of the plenum mounted to the fixture illustrated in FIG. 2.

The mounting fixture 22 in an exemplary embodiment is illustrated in more detail in FIGS. 2 and 3. The fixture includes a base adapter or plate 44 having a configuration which complements the end effector 18 for being fixedly mounted or attached thereto by the fasteners or screws extending therethrough. A pedestal or block 46 is affixed to the adaptor by being integrally formed therewith or fastened thereto and extends perpendicularly outwardly therefrom. The pedestal 46 is configured for receiving the specific form of the workpiece 12, and is also configured for fixedly supporting the entire plenum 24 around the workpiece.

A releasable clamp 48 is joined to the pedestal for affixing the workpiece 12 to the pedestal for movement therewith as the end effector is moved in three dimensional (3-D) space. The clamp 48 may have any suitable form such as the rigid bar illustrated which is mounted to the side of the pedestal with a couple of fasteners that clamp the bar to the enlarged base or dovetail end of the airfoil workpiece 12. As shown in FIG. 3, the pedestal 46 includes a notch in which a portion of the workpiece base is seated at one side, with the opposite side of the base being clamped by the bar clamp 48 to prevent movement thereof on the pedestal.

In this way, the base of the part 12 may be mounted to the distal end of the pedestal 46 with the remainder or airfoil portion of the workpiece extending inside the plenum 24. Accordingly the workpiece 12 is supported at least in part inside the plenum for undergoing laser forming of the airfoil portion thereof, with the remainder or base end of the workpiece being mounted in the pedestal and does not undergo laser forming.

The pedestal 46 therefore provides a convenient component for supporting both the workpiece and the plenum in a compact configuration which is readily portable by the end effector of the robot. The adapter 44 is affixed to the proximal end of the pedestal 46, whereas the plenum 24 is affixed to the opposite distal end of the pedestal 46. The clamp 48 is disposed longitudinally between the opposite ends of the pedestal and is readily accessible by the user.

Furthermore, most of the pedestal 46 remains exposed outside the small plenum 24 and permits various fittings, such as the Y-fitting of the gas supply hoses to be conveniently mounted for distributing the inert gas through two opposite inlets in the plenum.

The plenum 24 illustrated in FIG. 2 is relatively small and compact in size to closely correspond in size with the specific workpiece 12 to position the window 30 for substantially full lateral access to the workpiece by the incident laser beam 28 during operation. Since the portable plenum 24 as fixedly attached to the mounting fixture 22 which in turn is attached to the end effector 18 of the robot, the plenum should be as small as practical and lightweight for reducing its mass and inertia to permit substantially unobstructed travel of the robot arm for performing the desired scanning laser process.

The specific form of the portable plenum 24 may be custom designed for each intended workpiece or laser forming process from low-batch processing to high-batch processing as desired for the intended throughput for the process. In the exemplary configuration illustrated in FIGS. 2 and 3, the plenum 24 includes a floor 50 in the form of a flat sheet metal panel for receiving the workpiece 12 extending outwardly therefrom.

The plenum also includes four sidewalls 52, also in the form of flat sheet metal panels which are suitably joined to the common floor panel 50. One or more of the sidewalls 52 may include the quartz windows 30 suitably attached thereto. In the exemplary configuration illustrated in FIG. 3, the opposite front and back sidewalls 52 include similarly sized quartz windows 30 extending outwardly from the floor panel and contained within a generally U-shaped perimeter or frame.

The plenum also includes a ceiling 54 in the form of another sheet metal panel suitably joined to the sidewalls 52 to substantially enclose the plenum 24 on all sides thereof, with the workpiece 12 extending inside the plenum 24.

FIG. 3 illustrates an exploded view of the plenum 24 in which two of the sidewalls 52 are integrally formed with the floor 50 and ceiling 54 in a sheet metal construction fabricated and suitably welded together in a rectangular box component. The two front and back sidewalls are separate sheet metal components in which the corresponding front and back quartz windows 30 are suitably attached by mechanical fixturing, or by a suitable adhesive such as silicone.

The two fittings which define the corresponding inlets 32 are disposed in the lateral sidewalls of the plenum through corresponding apertures therein. The outlet 42 may be in the form of a rectangular aperture formed in the floor 50 through which the airfoil end of the workpiece 12 may be inserted during assembly.

FIG. 2 illustrates the airfoil end of the workpiece 12 extending into the plenum 24 that is closed at its front and back sidewalls by suitable screw fasteners. The outlet 42 is suitably larger than the perimeter of the airfoil which extends therethrough to provide a clearance around the workpiece for discharging the inert gas 34 therearound during operation.

If desired, the outlet to the plenum may be provided by one or more other forms of apertures or fittings extending through the various walls thereof. The removable front and back sidewalls of the plenum are flat sheet metal which form effective contact seals with mounting flanges of the remaining panels of the plenum when affixed thereto after assembly. No additional sealing of the plenum is desired or required since a controlled amount of leakage of the inert gas 34 through the various contact joints of the plenum panels may be used to advantage for suitably discharging the inert gas from the plenum during operation.

The introduction of the portable plenum 24 to the end effector of the robot permits laser forming of the workpiece 12 with local protection thereof by the inert gas contained in the plenum. As shown in FIG. 3, the workpiece 12 is initially mounted to the pedestal 46 of the fixture by the clamp 48. The plenum 24 is assembled to form an enclosing chamber around the distal end of the workpiece, with the plenum being suitably fixedly mounted to the distal end of the pedestal.

The mounting fixture 22, the workpiece 12 mounted thereto, and the protective plenum 24 are mounted as an assembly to the end effector 18 as illustrated in FIGS. 1 and 2 for controlled movement thereof by the robot 14 during operation.

The gas supply 36 is operated for channeling the inert gas through the plenum 24 for initially purging any air contained therein after initial assembly and then forming a protective blanket of inert gas around the enclosed workpiece for protection thereof during laser forming.

The controller 20 of the robot 14 illustrated in FIG. 1 is suitably programmed with the desired scanning path of the workpiece 12 in 3-D space relative to the stationary laser 26. The robot arm 16 is then precisely moved in 3-D space to scan the laser beam 28 across the desired path on the exposed surface of the workpiece 12 for laser forming thereof inside the inert gas blanket.

Since the workpiece 12 is at all times bathed in the inert gas, it is protected from the elevated temperature of the workpiece due to laser heating thereof in which local thermal distortion of the workpiece is effected for in turn effecting the desired laser forming process. For example, the relatively thin airfoil portion of the workpiece 12 may be locally laser formed for introducing a predetermined bend therein which may be used for correcting any slight out of specification twist or lean of the airfoil.

The local inert gas containment inside the plenum 24 protects the workpiece from the high temperature to prevent undesirable oxidation of the workpiece surface, or other heat affected quality such as undesirable discoloration.

The two windows 30 provided on opposite sides of the plenum 24 illustrated in FIG. 2 permit laser forming of both sides of the airfoil workpiece in turn during the laser forming sequence.

Upon completion of the laser forming process, the clamp 48 may be released for removing the individual workpiece from the assembled plenum 24, and the next successive workpiece may be reinstalled into the assembled plenum 24, with the clamp 48 being reattached for securely mounting the workpiece inside the plenum. The laser forming process may then be repeated on this next workpiece, with the process being repeated as desired for a series of workpieces in any desired batch quantity.

The portable plenum 24 therefore provides a compact enclosure specifically configured and sized for the intended workpiece 12, both commonly mounted to the end effector 18 by the mounting fixture 22. The compact plenum moves readily with the protected workpiece in unison from the common end effector 18 during all movement of the robot arm 16 in 3-D space.

During laser processing, the path of the laser beam 28 across the exposed surface of the workpiece 12 visible through the corresponding windows 30 is relatively short, but precise in 3-D space, and the gas hoses 38 provide the only other physical link with a stationary structure such as the gas supply 36. The hoses 38 are suitably flexible to permit unrestrained movement of the workpiece and plenum over the intended scanning path for the workpiece mounted inside the plenum.

As indicated above, the specific configuration of the plenum 24 may vary for specific embodiments of the desired workpieces 12, but in all cases should remain relatively compact and small for closely containing and protecting the workpiece which travels with the end effector during operation. Preferred configurations of the plenums for protecting the workpieces should provide convenient access for installing and removing individual workpieces from the plenum in a minimum amount of set up time for increasing the production rate of the laser forming process for a series of workpieces.

The small volume of the plenum ensures that it may be rapidly purged of air at the commencement of each laser forming process, with a minimum requirement for inert gas protection during the laser forming process. Leakage or discharge of the inert gas during the laser process may be controlled by either metering the inlet flowrate of the inert gas or metering the outlet or leakage rate of the inert gas from the plenum.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

What is claimed is:

1. A laser forming system comprising:
    a mounting fixture for supporting a workpiece;
    a laser for projecting a laser beam at said workpiece;
    a motion system mechanically coupled to said mounting fixture via an end effector, whereby said motion system can precisely translate said workpiece in three orthogonal axes;
    a plenum affixed to said mounting fixture for enclosing said workpiece, said plenum including an outlet providing a clearance around said workpiece for allowing the discharge of gas during an operation;
    a gas supply joined in flow communication with said plenum for providing said gas to said plenum; and
    said laser aligned with said plenum such that laser forming is effected inside said plenum as said motion system translates said workpiece with respect to said laser beam.

2. A system according to claim 1, wherein said motion system comprises a robot including a movable arm attached to said end effector, said laser forming system further comprising a controller operatively joined to said robot and configured for moving said robot arm to scan said laser beam across said workpiece for laser forming thereof inside said plenum.

3. A system according to claim 2 wherein said plenum includes a window sealing closed said plenum thereat and transparent to said laser beam for projection therethrough.

4. A system according to claim 3 wherein said plenum further includes an inlet disposed in flow communication with said gas supply for receiving said inert gas, and an outlet for allowing discharging of said gas therefrom.

5. A system according to claim 4 wherein said mounting fixture comprises:
    an adapter for mounting said fixture to said end effector for movement therewith;
    a pedestal affixed to said adapter for receiving said workpiece, and fixedly supporting said plenum around said workpiece; and
    a clamp for affixing said workpiece to said pedestal at least in part inside said plenum.

6. A system according to claim 5 wherein said adapter is affixed to a proximal end of said pedestal, and said plenum is affixed to a distal end of said pedestal, and said clamp is disposed therebetween.

7. A system according to claim 6 wherein said plenum further comprises:
    a floor for receiving said workpiece;
    sidewalls joined to said floor, and including said window therein; and
    a ceiling joined to said sidewalls to enclose said plenum and said workpiece extending therein.

8. A system according to claim 7 wherein said inlet is disposed in said sidewalls, and said outlet is disposed in said floor and provides a clearance around said workpiece for discharging said gas therearound.

9. A system according to claim 3 wherein said plenum corresponds in size with said workpiece to position said window for substantially full lateral access to said workpiece by said laser beam.

10. A system according to claim 1, wherein said motion system comprises a NC system or a motorized stage.

* * * * *

UNITED STATES PATENT AND TRADEMARK OFFICE
CERTIFICATE OF CORRECTION

PATENT NO.        : 7,667,157 B2
APPLICATION NO. : 11/089750
DATED             : February 23, 2010
INVENTOR(S)       : Zhang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 844 days.

Signed and Sealed this

Twenty-eighth Day of December, 2010

David J. Kappos
*Director of the United States Patent and Trademark Office*